United States Patent
Holloway

(10) Patent No.: US 9,976,738 B1
(45) Date of Patent: May 22, 2018

(54) LIGHTING SYSTEM FOR A SECTIONAL DOOR AND METHOD

(71) Applicant: Graham Holloway, Santa Maria, CA (US)

(72) Inventor: Graham Holloway, Santa Maria, CA (US)

( * ) Notice: Subject to any disclaimer, the term of this patent is extended or adjusted under 35 U.S.C. 154(b) by 0 days. days.

(21) Appl. No.: 15/629,245

(22) Filed: Jun. 21, 2017

Related U.S. Application Data

(60) Provisional application No. 62/372,429, filed on Aug. 9, 2016.

(51) Int. Cl.
| | |
|---|---|
| *F21V 23/04* | (2006.01) |
| *F21V 21/00* | (2006.01) |
| *F21V 33/00* | (2006.01) |
| *E06B 3/48* | (2006.01) |
| *F21S 8/00* | (2006.01) |
| *F21S 2/00* | (2016.01) |
| *F21V 17/10* | (2006.01) |
| *E06B 3/00* | (2006.01) |

(52) U.S. Cl.
CPC .............. *F21V 33/006* (2013.01); *E06B 3/485* (2013.01); *F21S 2/00* (2013.01); *F21S 8/031* (2013.01); *F21V 17/107* (2013.01); *E06B 3/00* (2013.01); *F21V 33/00* (2013.01)

(58) Field of Classification Search
CPC ...... F21V 33/006; F21V 17/107; F21V 33/00; F21S 2/00; F21S 8/031; E06B 3/485; E06B 3/00; E06B 9/15
See application file for complete search history.

(56) References Cited

U.S. PATENT DOCUMENTS

| | | | | |
|---|---|---|---|---|
| 4,329,739 | A * | 5/1982 | Loebner | F21S 8/032 362/153 |
| 6,084,358 | A | 7/2000 | Dolson | |
| 6,736,534 | B1 * | 5/2004 | Fite | E06B 7/30 362/145 |
| 7,972,027 | B1 * | 7/2011 | Hatfield | F21S 2/00 362/217.02 |
| 9,725,947 | B2 * | 8/2017 | Seehof | E06B 7/28 |

* cited by examiner

*Primary Examiner* — Donald Raleigh
(74) *Attorney, Agent, or Firm* — Ted Masters

(57) ABSTRACT

A lighting system attaches to a sectional door. The sectional door has a plurality of hinge-connected panels which roll along left and right tracks which are connected to a structure. Each panel has an inside surface. The sectional door is positionable to a closed position and to an open position. The lighting system includes a light which connects to the inside surface of a panel of the sectional door. A movable electric contactor connects to a panel of the sectional door, and a fixed electric contactor connects to the structure. A holder carries the fixed contactor, the holder is shaped and dimensioned to removably connect to either the left track or to the right track. In the open position of the sectional door the movable electric contactor is configured to contact the fixed electric contactor and energize the light.

20 Claims, 6 Drawing Sheets

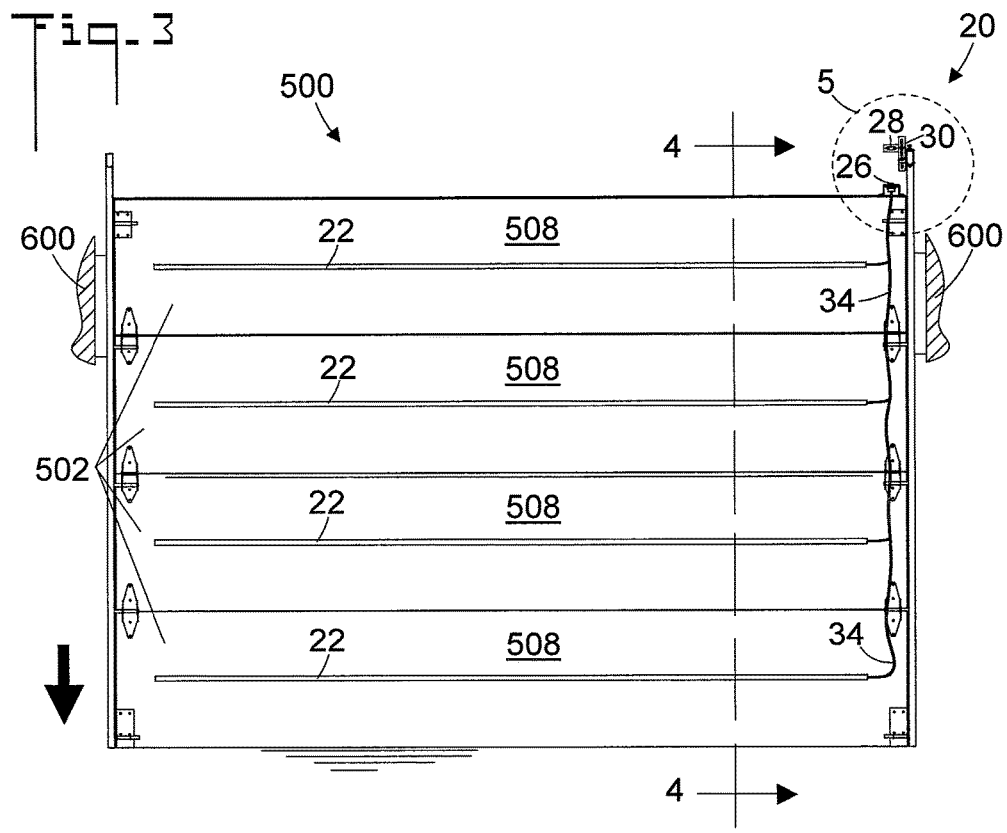
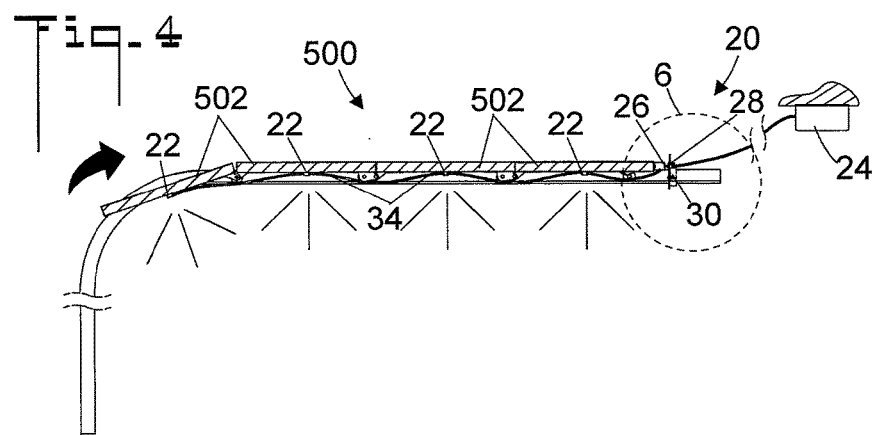

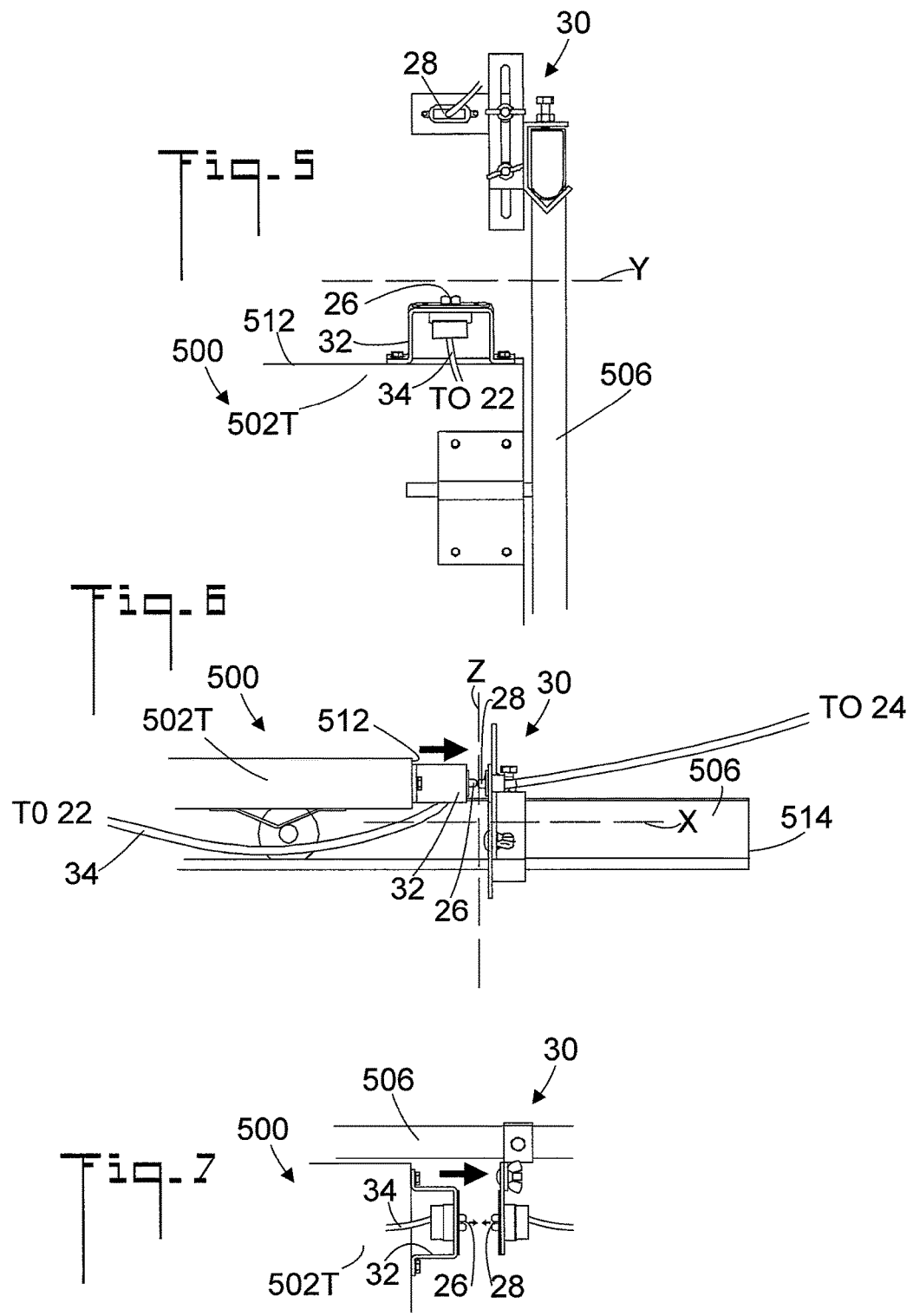

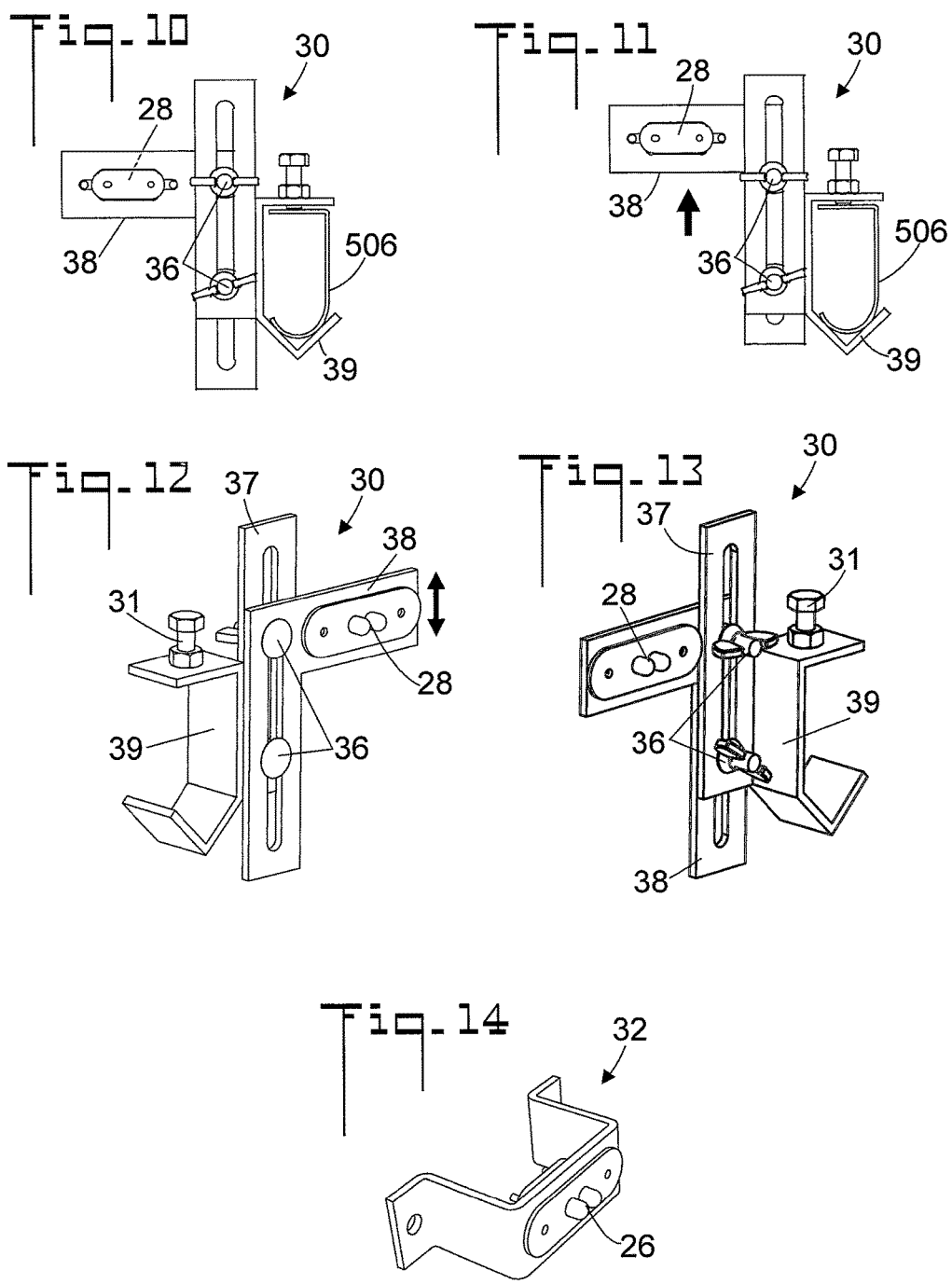

LIGHTING SYSTEM FOR A SECTIONAL DOOR AND METHOD

CROSS REFERENCE TO RELATED APPLICATION

This application claims the filing benefit under 35 U.S.C. § 119(e) of U.S. Provisional Application No. 62/372,429, filed Aug. 9, 2016, which is hereby incorporated by reference.

TECHNICAL FIELD

The present invention pertains generally to sectional doors, and more particularly to a lighting system which is attached to the inside surface of the door.

BACKGROUND OF THE INVENTION

Sectional doors are well known in the art, and consist of several hinge-connected panels which slide from a closed vertical position to an open horizontal overhead position. Each panel has rollers on its side edges which move in door tracks mounted to a structure. Sectional doors are typically used in fixed structures such as home garages and commercial buildings, and also in mobile structures such as trucks and delivery vans. A motorized opening and closing mechanism can be connected near the top of the door to effect the opening and closing action. A problem however exists with sectional doors. When the door is in the open horizontal overhead position, the door blocks light from light fixtures which are mounted on the ceiling of the structure.

BRIEF SUMMARY OF THE INVENTION

The present invention is directed to a lighting system and method for a sectional door. The lighting system is connected to the inside surface of the sectional door and provides a high intensity light source. As such, the system solves the problem of blocked ceiling light when the sectional door is opened. Additionally the lighting system provides improved structure illumination for security reasons by allowing a better view of previously darkened areas. In an embodiment, the lighting system utilizes a longitudinal string of low voltage LED lights which are connected to each panel of the sectional door. The lighting system can be retrofit on existing structures such as garages, warehouses, or vehicles such as trucks and delivery vans, or can be included as original equipment.

The lighting system utilizes two electric contactors; a fixed contactor is mounted to the track of the sectional door, and a movable contactor is mounted to the top of the door. When the sectional door is opened, the contactors engage and complete an electrical circuit which energizes the lights, thereby lighting up the entire underside of the sectional door.

In accordance with an embodiment, a lighting system is provided for a sectional door. The sectional door has a plurality of connected panels which roll along left and right tracks which are connected to a structure. Each panel has an inside surface. The sectional door is positionable to a closed position and to an open position. The lighting system includes a light which is connectable to the inside surface of a panel of the sectional door. A movable electric contactor is connectable to a panel of the sectional door. A fixed electric contactor is carried by a holder which is shaped and dimensioned to removably connect to either the left track or to the right track. In the open position of the sectional door the movable electric contactor is configured to contact the fixed electric contactor and energize the light.

In accordance with another embodiment, the holder is adjustable so that the fixed electric contactor is positionable to vertically align with the movable electric contactor.

In accordance with another embodiment, the holder has a body which is configured to connect to the left track or to the right track. A bracket carries the fixed electric contactor. The bracket is slidably connected to the body so that the electric contactor is positionable to a desired vertical position.

In accordance with another embodiment, the sectional door has a topmost panel, and the movable electric contactor is connectable to the topmost panel.

In accordance with another embodiment, the topmost panel has a top edge. A door holder carries the movable electric contactor and is connectable to the top edge of the topmost panel.

In accordance with another embodiment, a wiring harness connects the movable contactor to the light.

In accordance with another embodiment, there are a plurality of lights, wherein one light is connectable to each of the plurality of panels.

In accordance with another embodiment, the light includes a plurality of low voltage LED lights.

In accordance with another embodiment, alignment of the movable electric contactor with the fixed electric contactor is provided by (1) a position of the holder along the right or left track, (2) a position of the movable electric contactor along the topmost panel, and (3) a vertical position of the fixed electric contactor.

Other embodiments, in addition to the embodiments enumerated above, will become apparent from the following detailed description, taken in conjunction with the accompanying drawings, which illustrate, by way of example, the principles of the lighting system and method for a sectional door.

BRIEF DESCRIPTION OF THE DRAWINGS

FIG. 3 is an elevation view of the inside of the prior art sectional door with a lighting system installed;

FIG. 4 is a cross sectional view along the line 4-4 of FIG. 3;

FIG. 5 is an enlarged view of area 5 of FIG. 2;

FIG. 6 is an enlarged view of area 6 of FIG. 3;

FIG. 7 is a top plan view as in FIG. 6 just before electric contact is made;

FIG. 10 is an enlarged rear elevation view of a holder which carries the fixed contactor;

FIG. 11 is an enlarged rear elevation view of the holder adjusted so that the fixed electric contactor is in a different vertical position;

FIG. 12 is an enlarged front perspective view of the holder;

FIG. 13 is an enlarged perspective view of the holder in a reversed configuration;

FIG. 14 is an enlarged front perspective view of a door holder;

DETAILED DESCRIPTION OF THE INVENTION

Figure 1:
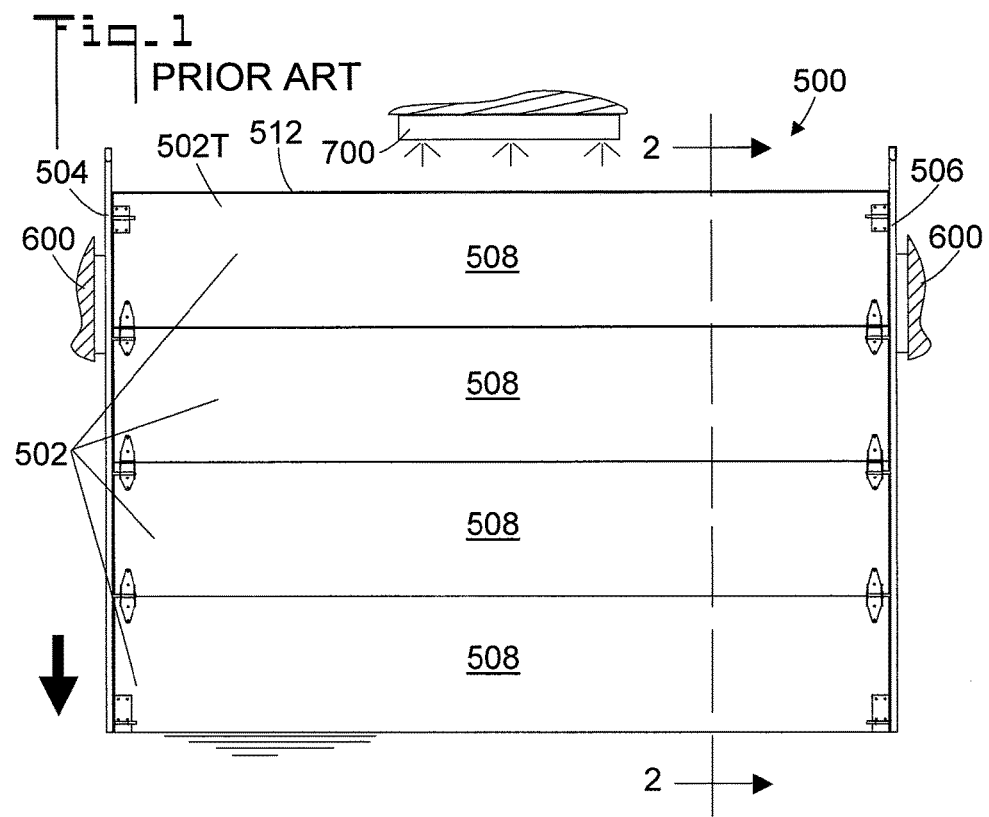
FIG. 1 is an elevation view of the inside of a prior art sectional door showing the door in a closed substantially vertical position.
Figure 2:
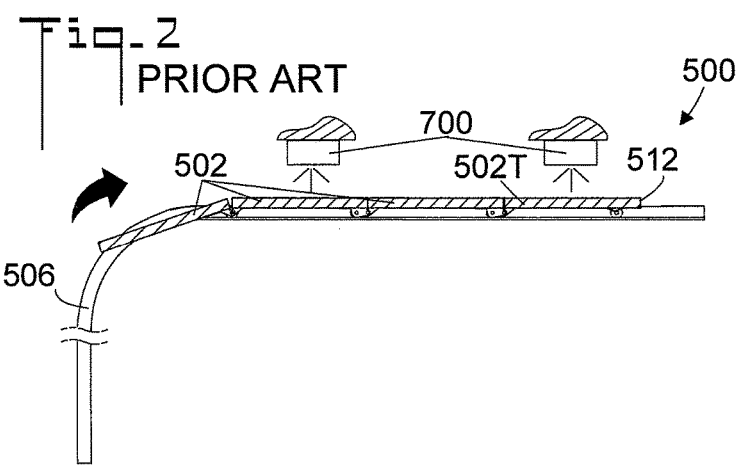
FIG. 2 is a cross sectional view along the line 2-2 of FIG. 1 showing the sectional door in an open substantially horizontal overhead position.

Referring initially to FIG. 1 there is illustrated an elevation view of the inside of a prior art sectional door 500 showing the door in a closed substantially vertical position. FIG. 2 is a cross sectional view along the line 2-2 of FIG. 1 showing the sectional door in an open substantially horizontal overhead position. Sectional door 500 includes a plurality of connected panels 502 which roll along left 504 and right 506 tracks which are connected to a structure 600 (e.g. a building such as a garage or warehouse, or to a mobile structure (vehicle) such as a truck or delivery van). Each panel 502 has an inside surface 508. Panels 502 include a topmost panel 502T which has a top edge 512. Sectional door 500 is positionable to the closed position of FIG. 1, and to the open position of FIG. 2. It is noted that in the open position sectional door 500 blocks light coming from light fixtures 700. It is noted that a view in the opposite direction of FIG. 2 would be the mirror image.

FIG. 3 is an elevation view of the inside of the prior art sectional door 500 with a lighting system 20 installed, and FIG. 4 is a cross sectional view along the line 4-4 of FIG. 3. FIG. 5 is an enlarged view of area 5 of FIG. 3, FIG. 6 is an enlarged view of area 6 of FIG. 4, and FIG. 7 is a top plan view FIG. 6. Lighting system 20 includes a light 22 which is connectable to the inside surface 508 of a panel 502 of sectional door 500. As used herein the term "light" is defined as a device which produces light (e.g. a light bulb). In the shown embodiment, there are a plurality of lights 22, wherein one light 22 is connectable to each of the plurality of panels 502. Lights 22 are powered by a power supply 24. In an embodiment each light 22 includes a long strip (string) containing multiple lights (e.g. bulbs) which longitudinally extends along the panel 502. For a garage door application the strips can be about 16 feet long and therefore provide a large lighted area. The strips can be connected to the inside surface 508 of panel 502 with an adhesive or by other mechanical means. In an embodiment, light 22 includes a plurality of low voltage LED lights, such as high intensity daylight white 6000 k 5050 LED chip light strips. These lights are powered by a 12 VDC 30 A regulated power supply 24. Power supply 24 can be a separate unit as shown, or in some installations low voltage power can be taken from the door's motorized opening and closing mechanism. As used here the term low voltage means a voltage which is 0 to 49 volts.

Lighting system 20 further includes a movable electric contactor 26 which is connectable to a panel 502 (topmost panel 502T as shown) of sectional door 500. Lighting system 20 further includes a fixed electric contactor 28 which is connectable to the structure 600. As used herein the term "connectable to the structure" means either directly connectable or indirectly connectable. In the open position of the sectional door (FIGS. 4 and 6) movable electric contactor 26 is configured to contact fixed electric 28 contactor and thereby complete an electrical circuit which energizes light 22. In an embodiment the movable 26 and fixed 28 contactors are two pole low voltage electrical contacts. The contacts are made of metal and are longitudinally spring-biased to an extended position so that they maintain electrical contact with the opposing contacts (refer to small arrows on FIG. 7).

A holder 30 carries fixed contactor 28 (also refer to FIGS. 9-13). Holder 30 is shaped and dimensioned to removably connect to either the left track 504 or to the right track 506. In the shown embodiment, holder 30 is fixedly connected to track 504 or 506 with a bolt 31.

Referring specifically to FIGS. 5 and 6, movable electric contactor 26 is connectable to the topmost panel 502T of sectional door 500. In the shown embodiment a door holder 32 carries movable electric contactor 26. Door holder 32 is connectable to the top edge 512 of the topmost panel 502T such as with screws. Referring to FIG. 6, in the open position of sectional door 500, topmost panel 502T moves in the direction of the arrow so that movable electric contactor 26 contacts fixed electric contactor 28 to complete the lighting circuit. FIG. 7 shows moving contactor 26 moving in the direction of the arrow toward fixed contactor 28 just before the electrical connection is made.

Lighting system 20 further includes a wiring harness 34 which connects movable contactor 26 to light(s) 22. Harness 34 is mounted to the inside surface 508 of door panels 502 in such a way that it freely moves as the door panels 502 separate and transition from the vertical to horizontal position and back again during opening and closing operation. Harness 34 is can be connected to the door panels 502 by an adhesive or other mechanical means.

Figure 8:
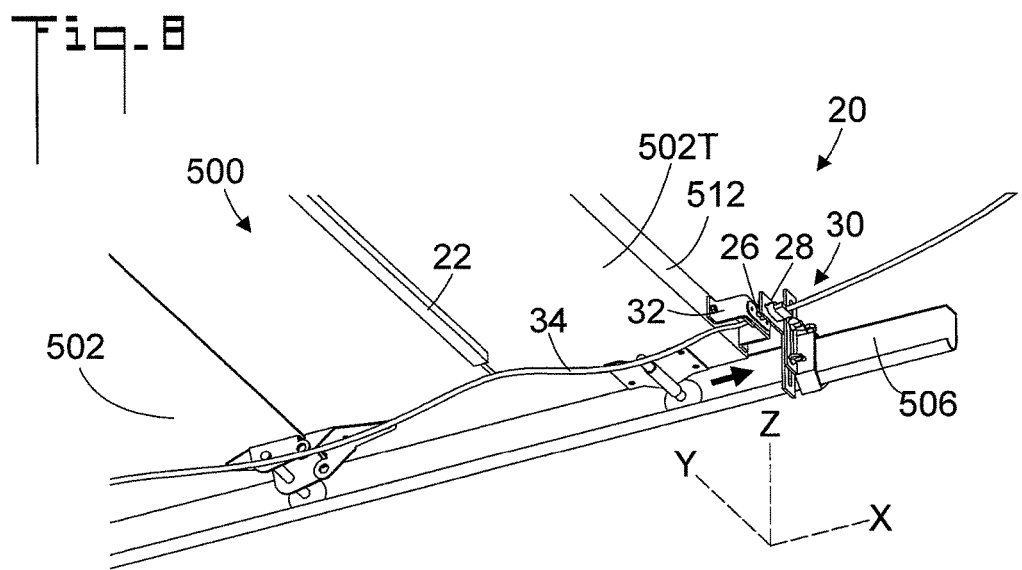
FIG. 8 is an enlarged bottom perspective view of a movable electric contactor making contact with a fixed electric contactor.

FIG. 8 is an enlarged bottom perspective view of movable electric contactor 26 making contact with fixed electric contactor 28. Fixed electric contactor 28 is mounted to holder 30 which is connected to right track 506. Movable electric contactor 26 is mounted to door holder 32 which is connected to the top edge 512 of the topmost panel 502T of sectional door 500. Sectional door 500 is in the open horizontal overhead position wherein movable electric contactor 26 contacts fixed electric contactor 28 to complete the electrical circuit which energizes lights 22. Mutually perpendicular alignment axes X, Y, and Z are also shown (also refer to FIGS. 5 and 6).

Figure 9:
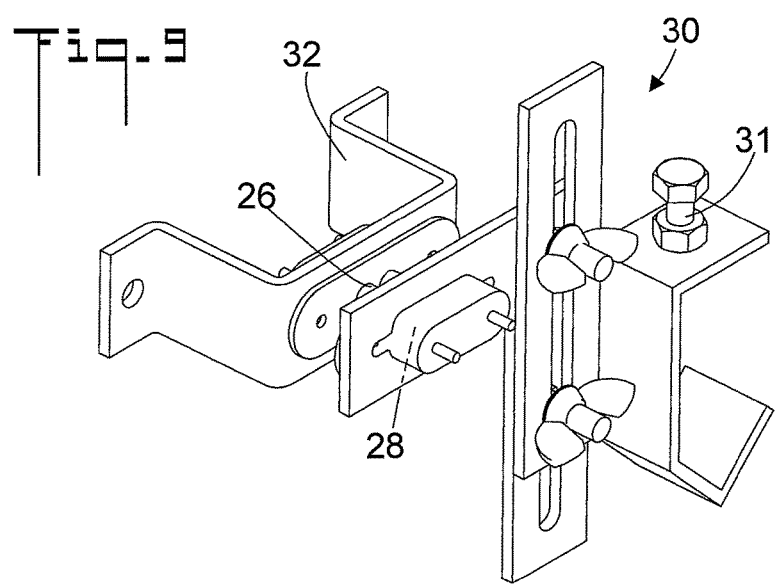
FIG. 9 is an enlarged top perspective view of the movable and fixed electric contactors.

FIG. 9 is an enlarged top perspective view of movable 26 and fixed 28 electric contactors. Movable contactor 26 is carried by door holder 32, and is connected by wiring harness 34 to lights 22 (refer also to FIG. 6). Fixed electric contactor 28 is carried by holder 30 and is electrically connected to low voltage power supply 24 (refer also to FIG. 6). Contactor 28 has prongs which receive a plug which is connected to power supply 24. Similarly contactor 26 has prongs which receive a plug connected to harness 34).

FIG. 10 is an enlarged rear elevation view of holder 30 which carries fixed contactor 28, and FIG. 11 is an enlarged rear elevation view of holder 30 adjusted so that fixed electric contactor 28 is in a different vertical position. Holder 30 is adjustable so that fixed electric contactor 28 is positionable to vertically align with movable electric contactor 26 (also refer to FIG. 6 and the double arrow of FIG. 12). In the shown embodiment the vertical adjustment is effected by two wing nuts 36. When loosened wing nuts 36 allow the bracket 38 upon which fixed electric contactor 28 is mounted to be vertically positioned so that fixed electric contactor 28 vertically aligns with movable electric contactor 26. This adjustment is necessary because the vertical position of sectional door 500 with respect to tracks 504 and 506 can vary from installation to installation (also refer to FIGS. 1 and 2).

FIG. 12 is an enlarged front perspective view of holder 30. Shown are fixed electric contactor 28, bolt 31, wing nuts 36, and bracket 38. It is noted that holder 30 has a body 39 which is configured to connect to left track 504 or right track 506 (in the shown embodiment body 39 partially fits around the tracks). A slide 37 is connected to body 39. Bracket 38 carries fixed electric contactor 28 and is connected to slide 37 by wing nuts 36. Bracket 38 is slidably connected to body 39 by slide 37 so that fixed electric contactor 28 is positionable (refer to arrows) to a desired vertical position. Also referring to FIG. 6, in an embodiment body 39 is shaped and dimensioned to fit over the end 514 of track 504 or 506.

FIG. 13 is an enlarged perspective view of holder 30 in a reversed configuration. Holder 30 is reversible so that it can be connected to either left track 504 or right track 506. In the shown embodiment, to reverse holder 30 the plastic housing of contactor 28 is disconnected from bracket 38, turned 180°, and reconnected on the opposite side of bracket 38.

FIG. 14 is an enlarged front perspective view of door holder 32 and movable electric contactor 26.

Figure 15:
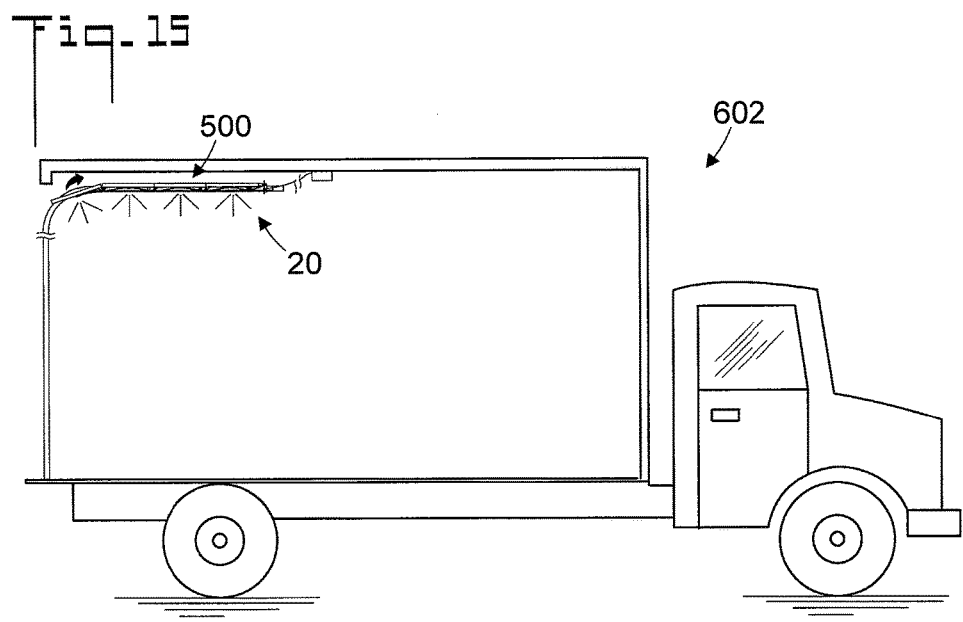
FIG. 15 is a cutaway view of the lighting system installed on a movable structure; and, FIG. 16 is a schematic diagram of the lighting system.

FIG. 15 is a cutaway view of lighting system 20 installed on the sectional door 500 of a movable structure 602 such as a truck or delivery van.

Figure 16:
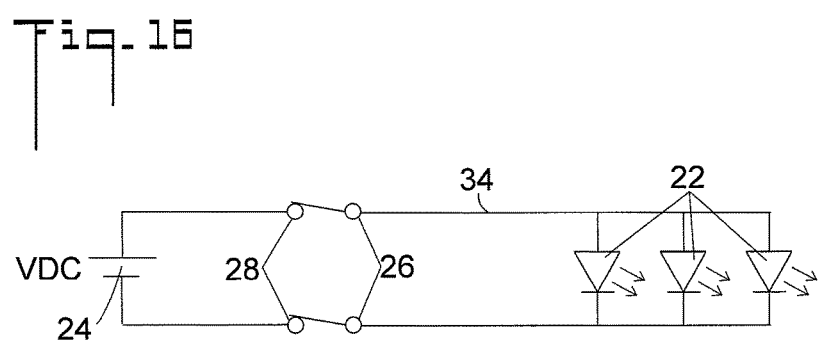

FIG. 16 is a schematic diagram of lighting system 20 showing power supply 24, movable contactor 26, fixed contactor 28, lights 22, and harness 34.

It may be appreciated that lighting system 20 can be combined with a sectional door to form a lighted structure 600/602.

Referring to FIGS. 5-6, movable electric contactor 26 and fixed electric contactor 28 must be aligned in three dimensions in order make contact when sectional door 500 is in the open horizontal overhead position. In an embodiment, to effect this alignment the following procedure is used:

A method for installing lights in a structure 600/602 includes:

(a) providing a sectional door 500 having a plurality of connected panels 502, including a topmost panel 502T, which roll along left 504 and right 506 tracks which are connected to the structure 600/602, each panel 502 having an inside surface 508, the sectional door 500 is positionable to a closed position and to an open position (b) providing a lighting system 20 including;
a light 22 which is connected to the inside surface 508 of the panel 502 of the sectional door 500;
a movable electric contactor 26 which is connectable to the topmost panel 502T of the sectional door 500;
a fixed electric contactor 28 which is connectable to the structure 600/602;
a holder 30 which carries the fixed contactor 28, the holder 30 is removably connectable to either the left track 504 or to the right track 504, the holder 30 is adjustable so that the fixed electric contactor 28 is positionable to vertically align with the movable electric contactor 26;
a door holder 32 which carries the movable electric contactor 26, the door holder 32 is connectable to the topmost panel 502T;
in the open position of the sectional door 500 the movable electric contactor 26 is configured to contact the fixed electric contactor 28 and energize the light 22;

(c) placing the sectional door 500 in the open position;
(d) positioning the holder 30 in an X axis along the left track 504 or the right 506 track until the fixed electric contactor 28 is in the proximity of the topmost panel 502T;
(e) positioning the door holder 30 in a Y axis along the topmost panel 502T until the movable electric contactor 26 aligns with the fixed electric contactor 28;

(f) fixedly attaching the door holder 32 to the topmost panel 502T;
(g) vertically adjusting the holder 30 in a Z axis so that the fixed electric contactor 28 aligns with the movable electric contactor 26; and,
(h) moving the holder 30 along the X axis until the fixed electric contactor makes electrical contact with the movable electric contactor 26; and,
(i) locking the holder 30 in place on the left track 504 or the right track 506.

Unless specifically otherwise stated, and as applicable, the order of performance of the above cited method steps can be changed.

The embodiments of the lighting system and method for a sectional door described herein are exemplary and numerous modifications, combinations, variations, and rearrangements can be readily envisioned to achieve an equivalent result, all of which are intended to be embraced within the scope of the appended claims. Further, nothing in the above-provided discussions of the system and method should be construed as limiting the invention to a particular embodiment or combination of embodiments. The scope of the invention is defined by the appended claims.

I claim:

1. A lighting system for a sectional door having a plurality of connected panels which roll along left and right tracks which are connected to a structure, each panel having an inside surface, the sectional door is positionable to a closed position and to an open position, the lighting system comprising:
a light which is connectable to the inside surface of a panel of the sectional door;
a movable electric contactor which is connectable to a panel of the sectional door;
a fixed electric contactor;
a holder which carries said fixed contactor, said holder is shaped and dimensioned to removably connect to either the left track or to the right track; and,
in the open position of the sectional door said movable electric contactor is configured to contact said fixed electric contactor and energize said light.

2. The lighting system according to claim 1, further including:
said holder is adjustable so that said fixed electric contactor is positionable to vertically align with said movable electric contactor.

3. The lighting system according to claim 2, further including:
said holder having a body which is configured to connect to the left track or to the right track; and,
a bracket which carries said fixed electric contactor, said bracket is slidably connected to said body so that said electric contactor is positionable to a desired vertical position.

4. The lighting system according to claim 1, the sectional door having a topmost panel, the lighting system further including:
said movable electric contactor is connectable to the topmost panel.

5. The lighting system according to claim 4, the topmost panel having a top edge, the lighting system further including:
a door holder which carries said movable electric contactor, said door holder is connectable to the top edge of the topmost panel.

6. The lighting system according to claim 1, further including:

a wiring harness which connects said movable contactor to said light.

7. The lighting system according to claim 1, further including:
a plurality of said lights, wherein one said light is connectable to each of the plurality of panels.

8. The lighting system according to claim 1, further including:
said light including a plurality of low voltage LED lights.

9. The lighting system according to claim 1, further including:
said holder is adjustable so that said fixed electric contactor is positionable to vertically align with said movable electric contactor;
said movable electric contactor is connectable to the topmost panel of the sectional door; and,
alignment of said movable electric contactor with said fixed electric contactor provided by (1) a position of said holder along the right or left track, (2) a position of said movable electric contactor along the topmost panel, and (3) a vertical position of said fixed electric contactor.

10. The lighting system according to claim 1, the sectional door having a topmost panel and the topmost panel having a top edge, the lighting system further including:
said holder is adjustable so that said fixed electric contactor is positionable to vertically align with said movable electric contactor;
a door holder which carries said movable electric contactor, said door holder is connectable to the top edge of the topmost panel;
a wiring harness which connects said movable contactor to said light;
a plurality of lights, wherein one said light is connectable to each of the plurality of panels; and,
said light including a plurality of low voltage LED lights.

11. A lighted structure, comprising:
a sectional door having a plurality of connected panels which roll along left and right tracks which are connected to the structure, each said panel having an inside surface, said sectional door is positionable to a closed position and to an open position
a lighting system including:
a light which is connected to said inside surface of a said panel of said sectional door;
a movable electric contactor which is connected to a said panel of said sectional door;
a fixed electric contactor;
a holder which carries said fixed contactor, said holder removably connected to either said left track or to said right track; and,
in the open position of said sectional door said movable electric contactor is configured to contact said fixed electric contactor and energize said light.

12. The lighted structure according to claim 11, further including:
said holder is adjustable so that said fixed electric contactor is positionable to vertically align with said movable electric contactor.

13. The lighted structure according to claim 12, further including:
said holder having a body which is configured to connect to said left track or to said right track; and,
a bracket which carries said fixed electric contactor, said bracket is slidably connected to said body so that said electric contactor is positionable to a desired vertical position.

14. The lighted structure according to claim 11, further including:
said sectional door having a topmost panel; and,
said movable electric contactor is connected to said topmost panel.

15. The lighted structure according to claim 14, further including:
said the topmost panel having a top edge; and,
a door holder which carries said movable electric contactor, said door holder is connected to said top edge of said topmost panel.

16. The lighted structure according to claim 11, further including:
a wiring harness which connects said movable contactor to said light.

17. The lighted structure according to claim 11, further including:
a plurality of said lights, wherein one said light is connectable to each of said plurality of panels.

18. The lighted structure according to claim 11, further including:
said light including a plurality of low voltage LED lights.

19. The lighted structure according to claim 11, further including:
said holder having a vertical adjustment which allows said fixed electric contactor to be vertically moved to align with said movable electric contactor;
said movable electric contactor is connectable to said topmost panel of said sectional door; and,
alignment of said movable electric contactor with said fixed electric contactor provided by (1) a position of said holder along said right or left track, (2) a position of said movable electric contactor along said topmost panel, and (3) a vertical position of said fixed electric contactor.

20. A method for installing lights in a structure, comprising:
(a) providing a sectional door having a plurality of connected panels, including a topmost panel, which roll along left and right tracks which are connected to the structure, each said panel having an inside surface, said sectional door is positionable to a closed position and to an open position;
(b) providing a lighting system including;
a light which is connected to said inside surface of a said panel of said sectional door;
a movable electric contactor which is connectable to said topmost panel of said sectional door;
a fixed electric contactor;
a holder which carries said fixed contactor, said holder is removably connectable to either said left track or to said right track, said holder is adjustable so that said fixed electric contactor is positionable to vertically align with said movable electric contactor;
a door holder which carries said movable electric contactor, said door holder is connectable to said topmost panel;
in the open position of said sectional door said movable electric contactor is configured to contact said fixed electric contactor and energize said light;
(c) placing said sectional door in the open position;
(d) positioning said holder in an X axis along said left track or said right track until said fixed electric contactor is in the proximity of said topmost panel;
(e) positioning said door holder in a Y axis along said topmost panel until said movable electric contactor aligns with said fixed electric contactor;

(f) fixedly attaching said door holder to said topmost panel;
(g) vertically adjusting said holder in a Z axis so that said fixed electric contactor aligns with said movable electric contactor;
(h) moving said holder along said X axis until said fixed electric contactor makes electrical contact with said movable electric contactor; and,
(i) locking said holder in place on said left track or said right track.

* * * * *